United States Patent
Bill

(10) Patent No.: US 11,872,855 B2
(45) Date of Patent: Jan. 16, 2024

(54) DETERMINING A STATUS OF A TYRE MONITORING DEVICE

(71) Applicant: AIRBUS OPERATIONS LIMITED, Bristol (GB)

(72) Inventor: Andrew Bill, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 238 days.

(21) Appl. No.: 17/418,283

(22) PCT Filed: Jun. 16, 2020

(86) PCT No.: PCT/EP2020/066545
§ 371 (c)(1),
(2) Date: Jun. 25, 2021

(87) PCT Pub. No.: WO2020/254277
PCT Pub. Date: Dec. 24, 2020

(65) Prior Publication Data
US 2022/0088979 A1    Mar. 24, 2022

(30) Foreign Application Priority Data
Jun. 17, 2019 (GB) ...................... 1908642

(51) Int. Cl.
*B60C 23/04* (2006.01)
*G05B 23/02* (2006.01)
*B64F 5/60* (2017.01)

(52) U.S. Cl.
CPC ...... *B60C 23/0481* (2013.01); *B60C 23/0403* (2013.01); *B60C 23/0405* (2013.01);
(Continued)

(58) Field of Classification Search
CPC ............ B60C 23/0408; B60C 23/0496; B60C 23/061; B60C 23/0494; B60C 23/0416;
(Continued)

(56) References Cited

U.S. PATENT DOCUMENTS

| 5,717,376 A | 2/1998 | Wilson |
| 6,580,364 B1 | 6/2003 | Munch et al. |

(Continued)

FOREIGN PATENT DOCUMENTS

| DE | 10 2015 223968 | 6/2017 |
| DE | 10 2016 222 304 A1 | 5/2018 |

(Continued)

OTHER PUBLICATIONS

International Search Report for PCT/EP2020/066545 dated Sep. 28, 2020, 3 pages.
(Continued)

*Primary Examiner* — Andre J Allen
(74) *Attorney, Agent, or Firm* — Nixon & Vanderhye P.C.

(57) ABSTRACT

A method of determining a status of a tyre monitoring device is disclosed. The tyre monitoring device includes a counter initiated on a first use of the tyre monitoring device on a wheel and the method includes: determining a current value of the counter; determining a status of the tyre monitoring device based on the current value of the counter; and providing an indication based on the determined status. In some examples, the status is a remaining service lifetime and the indication may be a replacement notification. A method of cross-checking data between tyre monitoring devices is also disclosed. The method includes receiving data from a plurality of tyre monitoring devices associated with respective tyres of a same vehicle; comparing the received data from different ones of the plurality of tyre monitoring devices; determining inconsistent data associated with at (Continued)

least one of the plurality of tyre monitoring devices based on the comparison; and providing an indication of the inconsistent data.

19 Claims, 8 Drawing Sheets

(52) U.S. Cl.
CPC ...... *B60C 23/0474* (2013.01); *B60C 23/0479* (2013.01); *B64F 5/60* (2017.01); *G05B 23/0283* (2013.01); *B60C 2200/02* (2013.01)

(58) Field of Classification Search
CPC . B60C 23/0433; B60C 23/0493; B60C 19/00; B60C 23/04; B60C 23/041; B60C 23/0411; B60C 23/0462; B60C 23/20; B60C 23/0444; B60C 23/0479; B60C 11/24; B60C 23/064; B60C 23/007; B60C 23/062; B60C 23/0401; B60C 23/0413; B60C 23/0488; B60C 23/06; B60C 23/043; B60C 23/0452; B60C 11/246; B60C 23/0467; B60C 23/0498; B60C 23/02; B60C 99/006; B60C 23/0428; B60C 23/0442; B60C 2019/004; B60C 23/009; B60C 23/0425; B60C 11/243; B60C 23/004; B60C 23/00354; B60C 23/045; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/00; B60C 23/044; B60C 23/008; B60C 23/0455; B60C 23/0454; B60C 23/0483; B60C 23/0461; B60C 23/0474; B60C 23/0415; B60C 23/0491; B60C 23/0489; B60C 25/002; B60C 29/064; B60C 23/00363; B60C 23/0481; B60C 11/0318; B60C 23/0459; B60C 23/0471; B60C 2019/005; B60C 23/002; B60C 23/042; B60C 2200/02; B60C 23/0422; B60C 23/0423; B60C 23/0466; B60C 23/0477; B60C 13/001; B60C 23/0405; B60C 29/06; B60C 23/0437; B60C 23/0476; B60C 25/132; B60C 23/0447; B60C 23/0449; B60C 23/0427; B60C 25/00; B60C 9/18; B60C 23/0484; B60C 13/00; B60C 19/003; B60C 23/0486; B60C 23/065; B60C 23/00336; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0457; B60C 25/18; B60C 11/13; B60C 23/0418; B60C 23/0469; B60C 23/12; B60C 29/066; B60C 23/068; B60C 25/005; B60C 25/138; B60C 99/00; B60C 11/03; B60C 23/005; B60C 23/0432; B60C 25/007; B60C 3/00; B60C 5/14; B60C 11/11; B60C 17/04; B60C 17/06; B60C 23/063; B60C 23/10; B60C 25/0554; B60C 25/14; B60C 29/062; B60C 99/003; B60C 11/032; B60C 11/12; B60C 13/003; B60C 19/001; B60C 23/0435; B60C 23/126; B60C 23/127; B60C 23/16; B60C 29/068; B60C 3/04; B60C 9/20; B60C 11/01; B60C 11/0302; B60C 13/02; B60C 15/06; B60C 25/056; B60C 29/005; B60C 29/04; B60C 5/142; B60C 11/0304; B60C 11/0306; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/131; B60C 23/135; B60C 23/137; B60C 23/18; B60C 25/02; B60C 7/12; B60C 11/02; B60C 17/0009; B60C 19/002; B60C 19/08; B60C 19/12; B60C 19/007; B60C 23/00347; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 2015/0678; B60C 23/085; B60C 25/0548; B60C 25/185; B60C 7/107; B60C 9/22; G05B 13/024; G05B 11/42; G05B 13/026; G05B 19/4183; G05B 19/41875; G05B 2219/31288; G05B 2219/31304; G05B 2219/31318; G05B 2219/32177; G05B 2219/35315; G05B 2219/36332; G05B 2219/37205; G05B 23/02
USPC .................................................. 73/146–146.8
See application file for complete search history.

(56) References Cited

U.S. PATENT DOCUMENTS

| | | | |
|---|---|---|---|
| 6,945,103 B1 * | 9/2005 | Lee | ..................... B60C 23/0459 73/146.5 |
| 10,989,978 B1 | 4/2021 | Tsen et al. | |
| 2003/0131657 A1 | 7/2003 | Anderson et al. | |
| 2015/0128691 A1 | 5/2015 | Keller | |
| 2016/0016445 A1 | 1/2016 | Peine et al. | |
| 2019/0184772 A1 | 6/2019 | Bill et al. | |
| 2020/0290410 A1 | 9/2020 | Davenport | |

FOREIGN PATENT DOCUMENTS

| | | | |
|---|---|---|---|
| EP | 1 092 569 | 4/2001 | |
| EP | 1388439 | 2/2004 | |
| EP | 2749437 | 7/2014 | |
| EP | 2 910 393 | 8/2015 | |
| EP | 3643541 B1 * | 7/2021 | ......... B60C 23/0416 |
| GB | 201908642.0 A | 6/2019 | |
| GB | 2 584 852 A | 12/2020 | |
| GB | 2 584 853 A | 12/2020 | |
| KR | 10-2013-0013982 A | 2/2013 | |
| KR | 10-1363058 B1 | 2/2014 | |

(56) References Cited

FOREIGN PATENT DOCUMENTS

WO          2020/254277  A1     12/2020
WO          2020/254282  A1     12/2020

OTHER PUBLICATIONS

Written Opinion of the ISA for PCT/EP2020/066545 dated Sep. 28, 2020, 6 pages.
Combined Search and Examination Report for GB1908642.0 dated Oct. 22, 2019, 8 pages.
International Search Report for Application No. PCT/EP2020/066551, three pages, dated Sep. 29, 2020.
Combined Search and Examination Report for Application No. GB 2019794.3, six pages, dated May 12, 2021.
Extended European Search Report for Application No. 21213730.1, 32 pages, dated Jun. 15, 2022.
Office Action for U.S. Appl. No. 17/551,283, 50 pages, dated May 5, 2023.

* cited by examiner

DETERMINING A STATUS OF A TYRE MONITORING DEVICE

CROSS REFERENCE TO RELATED APPLICATIONS

The present application is a National Phase of International Application Number PCT/EP2020/066545 filed Jun. 16, 2020, which designated the U.S. and claims priority benefits from Great Britain Application Number GB 1908642.0 filed Jun. 17, 2019, the entire contents of each of which are hereby incorporated by reference.

TECHNICAL FIELD

The present disclosure relates to a tyre monitoring system and methods of its operation. In examples, the present disclosure relates to an aircraft tyre monitoring system, such as an aircraft tyre pressure monitoring system.

BACKGROUND

Checking tyre pressure is an important part of the maintenance of a vehicle. Tyre pressures should be maintained at predetermined pressures to ensure that a tyre performs as intended by the manufacturer. Incorrect tyre pressure can lead to a tyre failing, perhaps bursting and causing damage to the vehicle and/or a loss of control. Due to the high speeds encountered by the tyres on aircraft landing gear, pressures are checked regularly, perhaps once a day or more frequently. Manual checking of tyre pressure takes time, reducing this time is beneficial.

It has been proposed to automate tyre pressure measurement by included a sensing device in a wheel which can then be interrogated wirelessly to provide a measurement of tyre pressure. This can reduce the time required compared to a manual reading, but can still take time due to a requirement to travel from wheel to wheel measuring the pressures.

It would be desirable to provide a tyre pressure measurement system which addresses some, or all, of these points.

SUMMARY

According to a first aspect, there is provided a method of determining a status of a tyre monitoring device comprising a counter initiated on a first use of the tyre monitoring device on a wheel, the method comprising: determining a current value of the counter; determining a status of the tyre monitoring device based on the current value of the counter; and providing an indication based on the determined status.

Optionally, the status of the tyre monitoring device is representative of an elapsed time period since the tyre monitoring device was first used on a wheel.

Optionally, the status of the tyre monitoring device is an estimated remaining service lifetime of the tyre monitoring device.

Optionally, the remaining service lifetime of the tyre monitoring device may be estimated using the current value of the counter and a reference value indicative of a predetermined service lifetime of the tyre monitoring device.

Optionally, the method may comprise comparing the estimated remaining service lifetime of the tyre monitoring device to a predetermined tyre replacement cycle for the tyre associated with the wheel on which the tyre monitoring device is installed; and wherein the providing an indication is based on the comparing.

Optionally, the method may comprise determining that the estimated remaining service lifetime of the tyre monitoring device expires between a scheduled time for a first tyre change and a scheduled time for a second tyre change of the predetermined tyre replacement cycle; and wherein the indication indicates that the tyre monitoring device is to be replaced at the time of the first tyre change.

Optionally, the indication may provide a warning about the status of the tyre monitoring device or the tyre associated with the tyre monitoring device.

Optionally, the method may comprise initiating action with respect to the tyre monitoring device responsive to the indication of status.

According to another aspect, there is provided a tyre monitoring device configured to be mounted on a wheel and comprising: a wireless communication interface; a counter configured to be activated on a first use of the tyre monitoring device and to increment a count periodically throughout the service life of the tyre monitoring device; and a processing system configured to execute the method as described above, with or without any of the optional features also described.

Optionally, the indication comprises a message transmitted to another device using the wireless communication interface.

According to a third aspect, there is provided tyre monitoring system, comprising at least one tyre monitoring device and a processing system configured to execute the method as described above, with or without any of the optional features also described, for the at least one tyre monitoring device.

According to a fourth aspect of the invention, there is provided a counter for a tyre monitoring device, the counter configured to: initiate a count in response to the tyre monitoring device entering normal operation; and increment the count as time passes, wherein an estimate of remaining life of the tyre monitoring device is determinable based on the count of the counter.

Further features and advantages of the invention will become apparent from the following description of preferred examples of the invention, given by way of example only, which is made with reference to the accompanying drawings.

DETAILED DESCRIPTION

Figure 1:
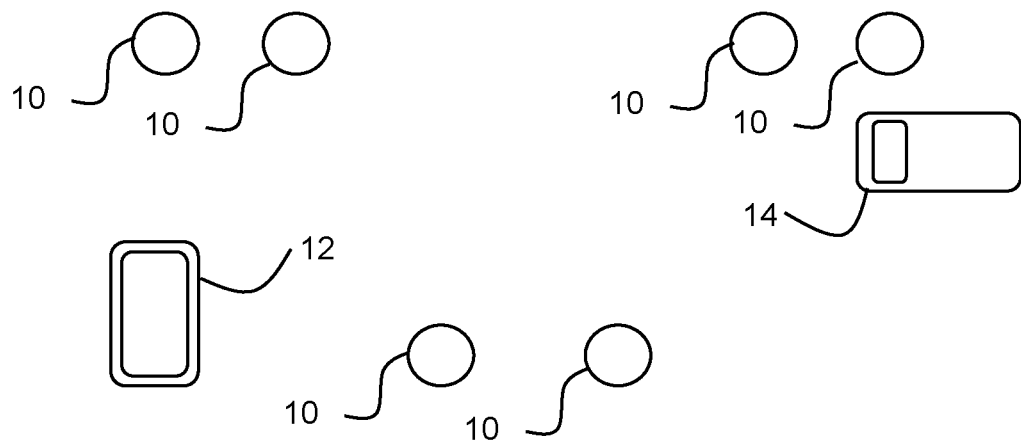
FIG. 1 shows a schematic representation of a tyre pressure sensor system according to a first example of the invention.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Certain methods and systems described herein relate to the operation of a sensor network in an aircraft. In examples described herein, references to "aircraft" include all kinds of aircraft, such as fixed wing, for example military or commercial aircraft, or unmanned aerial vehicles (UAVs), and rotary wing aircraft, for example helicopters.

According to examples herein, a tyre monitoring device comprises a counter that periodically increments a count throughout the service life of the tyre monitoring device, where a status of the tyre monitoring device can be determined based on the count of the counter. In this way, a life expectancy of the tyre monitoring device can be estimated without monitoring the battery state, which for some battery technologies can give little warning that a battery is approaching depletion. For example, a battery state, such as a measured potential difference between battery terminals may remain stable for a large proportion of the life of the battery before dropping off rapidly before depletion. The rapid drop off may give insufficient time to notify replacement before the battery is depleted. In addition, the battery state may be difficult to measure reliably due to variations in environmental conditions; tyre monitoring devices on aircraft can be exposed to significant temperature differences between cool air at high altitudes and higher temperatures on landing as brakes and tyres are heated.

According to examples herein, a method of determining a remaining life of a tyre monitoring device is provided in which the tyre monitoring device has a counter that is initiated on a first use of the tyre monitoring device. The counter can be compared with a predetermined service lifetime of the tyre monitoring device to provide an accurate and reliable representation of the remaining life of the tyre monitoring device. The initiation of the counter on first use of the tyre monitoring device means that the value of the counter provides an accurate and direct indication of the time in service and hence the remaining life of the monitoring device. This can ensure sufficient notice is given to take action if the device is approaching the end of its service life or the battery is nearing depletion so that the device requires replacement.

According to examples herein, a counter for a tyre monitoring device is provided. As described above, the counter periodically increments a count throughout the service life of the tyre monitoring device from first use of the device. The initiation of the counter at first use and its incremental, periodic count enables the counter to provide an accurate indication of the remaining life of the monitoring device.

According to examples herein, a method of assessing health of a tyre monitoring system and/or the monitored tyres of the tyre monitoring system comprises determining whether the received data from tyre monitoring devices is consistent between devices. Inconsistencies in this data can identify additional maintenance actions or potential faults in the tyre monitoring devices. For example, a differential pressure between tyres on the same axle may indicate that replacement of both tyres is required. Inconsistent reference pressures or other configuration data between different monitoring devices may indicate a fault in the monitoring device. In this way, a cross-check of data used at each of the tyre monitoring devices is carried out. This enables the control device to identify any inconsistencies of data across the plurality of tyre monitoring devices and possibly initiate rectifying action. This also guards against a memory corruption in any of the monitoring devices that affects the operation of said device, for example, corruption of configuration data, where such a corruption is not necessarily detectable by the tyre monitoring device itself. The method may be carried out on a control device of the tyre monitoring system or on another processing system.

Example Tyre Monitoring System

FIG. 1 shows a schematic representation of a tyre monitoring system, in this case a pressure sensor system according to a first example. The system comprises a plurality of tyre monitoring devices 10, a control device 12 and a configuration device 14, all of which are arranged to communicate via wireless communication. A tyre monitoring device is mounted on each wheel of a vehicle, in this case an aircraft (as explained in more detail below, with reference to FIG. 5). The control device 12 is separate from the tyre pressure sensors 10 and may be a dedicated control device which functions only in the tyre pressure sensor system, or a computing device which can also be used for other purposes than with the tyre pressure sensor system. Example computing devices include mobile devices such as laptops, tablets, cellular phones and wireless communication devices.

The wireless communications in the tyre pressure sensor system of FIG. 1 may use a local area network or a personal area network and can have any suitable topography, including centralized and mesh wireless systems. In centralized systems, a single device may be nominated as a master device to coordinate communications, or one or more additional wireless access points, gateways or controllers (not shown) may be used. In some examples, the tyre monitoring devices 10, control device 12 and configuration device 14 may all communicate using the same wireless technology and form a single network. In other examples one or more of the tyre monitoring devices 10, control device 12 and configuration device 14 may be separated from other elements of the system. Such separation may be provided in software, for example by providing a suitable firewall and/or the use of different network IDs and encryption keys. Such separation may also be provided by hardware, for example by different wireless communication technology. Both hardware and software separation may be combined. For example, in the system of FIG. 1, the control device communicates with the tyre sensing devices with a different wireless communication technology than the configuration, which may improve the security of the system.

Figure 2:
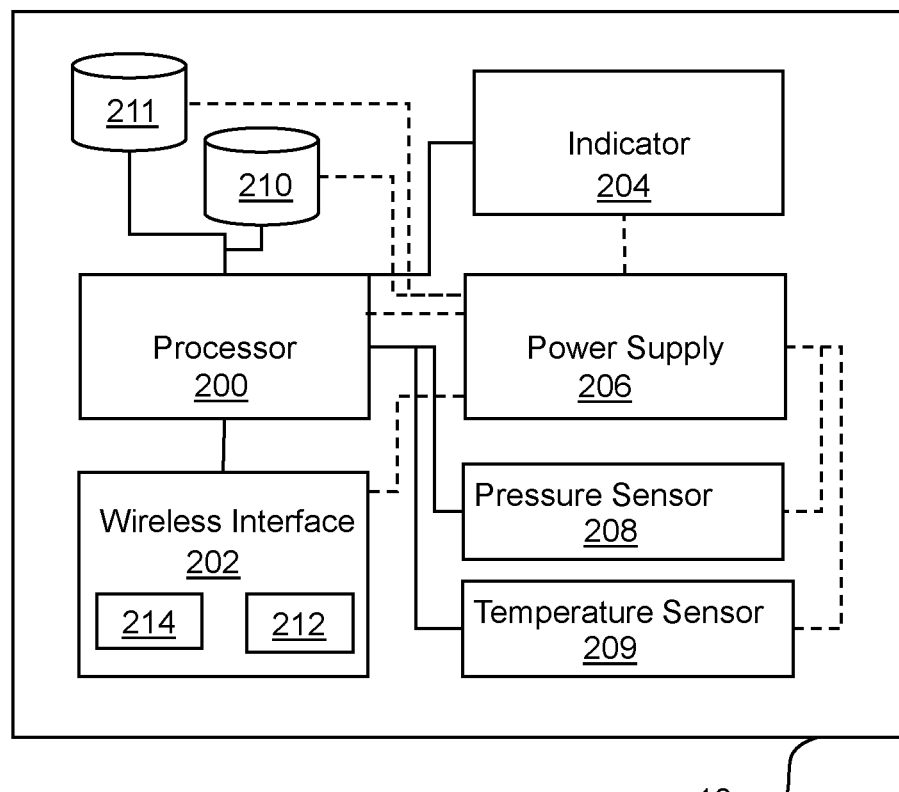
FIG. 2 shows a schematic representation of a tyre monitoring device for use in the example of FIG. 1.

FIG. 2 shows a schematic representation of a tyre monitoring device 10 for use in the tyre pressure sensor system of FIG. 1. The tyre monitoring device 10 is configured for mounting on a wheel, for example by a mechanical connection to an opening on the wheel providing access to the tyre. The tyre monitoring device 10 includes a processor 200, a wireless communication interface 202, an indicator 204, a power supply 206, and a pressure sensor 208, at temperature sensor 209, a first storage 210 and a second storage 211.

Processor 200 may be any suitable processing device including a microprocessor with one or more processing cores. In use, processor 200 coordinates and controls the other components and may be operative to read and/or write computer program instructions and data from/to the storage 210, 211. The processor may be optimized for low power operation or have at least one processing core optimized for low power operation in some examples.

Wireless communication interface 202 is connected to the processor 200 and is used to both transmit and received data from the other devices of the tyre pressure sensor system. In this example, the wireless communication interface includes two transceivers, 212, 214 which both use different wireless technology. A first transceiver 212 is provided for relatively long-range communication, up to about 50 m or about 100 m. For example, the first transceiver may use a communication standard suitable for mobile devices, such as IEEE 802.15.1, IEEE 802.15.4, IEEE 802.11 (Wi-Fi) on either the 2.4 GHz or 5 GHz Industrial Scientific and Medical (ISM) bands or a Wireless Avionics Intra-Communications (WAIC) standard. The first transceiver also includes an encryption module for encrypting sent data and decrypting received data, for example according to the Advanced Encryption Standard (AES) utilizing pre-shared keys. A second transceiver 214 is provided for relatively short-range communications. For example, the second transceiver 214 may use a standard according to IEEE 802.15, such as IEEE 802.15.4, RFID or Near Field Communication (NFC). The second transceiver may operate over a range of less than 5 m, less than 3 m, less than 1 m, less than 50 cm, less than 25 cm, less than 10 cm, less than 5 cm, less than 1 cm or requiring contact between devices. Like the first transceiver 212, the second transceiver 214 also includes an encryption module for encrypting sent data and decrypting received data.

In some examples, a single wireless transceiver may be provided in the wireless communication interface. In that case the single transceiver may use relatively short range or relatively long range communication, or adjust the range (such as by controlling transmit power) as required.

Indicator 204 is connected to the processor 200 and controlled by the processor 200 to provide indications to a user of the tyre pressure sensor system. In this example the indicator is an LED, but in other examples the indicator is another form of light, a display, such as an LCD or e-ink display, or any other form of visual indication. In other examples, the indicator is an audible indicator, such as a buzzer, beeper, speaker or any other sound generating component. In further examples, the indicator can comprise both audible and visual indication components. The indicator provides at least first and second indications, for example a first colour and a second colour of emitted light. Further indications can also be provided, such as solid or flashing light. The tyre monitoring device has a housing (not shown) and the indicator 204 can provide an indication outside the housing, for example the LED may be mounted external to the housing or visible through the housing, or sound may be able to be emitted from within the housing.

The power supply 206 provides power to the elements of the sensing device. It may be a battery, such as Lithium battery. In this example, the power supply is a Lithium battery with power sufficient to run the sensor in normal operation for about 2 to 3 years. In other examples the power supply may comprise a power harvesting system, for example harvesting vibration and/or electromagnetic radiation to charge a capacitor or battery which is then used to power the device.

In use, the wireless sensing device may spend much of its operational life in "sleep" or low power mode, with most of the components other than the processor and wireless communication interface powered off. This can conserve battery life. For example, the tyre monitoring device may be by default in a low power mode, listening for a command to measure or report tyre pressure. As tyre pressure readings are likely to be required relatively rarely, perhaps as little as once every 10 days, once every 5 days, once every 3 days or once per day, this can provide useful power savings. In other examples, pressure may be sensed more frequently for example every 10 minutes, 15 minutes, 20 minutes, 30 minutes, 1 hour or 2 hours and stored for use in trend monitoring.

The pressure sensor 208 is connected to processor 200 and may be any suitable sensor for measuring pressure, for example a capacitive sensor. Similarly, the temperature sensor 209 is connected to processor 200 and may be any suitable sensor for measuring temperature, such as thermocouple. The temperature sensor 209 may be arranged to measure the temperature of the wheel or the temperature of the gas inside the tyre directly. Where the temperature sensor 209 measures the temperature of the wheel, this can be processed to determine the temperature of the gas in the tyre. For example, an algorithm or look-up table may be used.

The connection of the pressure sensor 208 and temperature sensor 209 to the processor 200 may be digital, providing a digital representation of the measured pressure and/or temperature from an Analogue to Digital Convertor (ADC) in the sensor itself, or analogue, in which case the processor may include an ADC to sample the received signal. Including both a pressure sensor and a temperature may be useful to determine a temperature compensated pressure value. Although this example includes a pressure sensor and a temperature sensor, other examples may include only a pressure sensor, or may include further sensors.

This example includes two storage elements 210 and 211. Storage 210 is non-volatile rewritable storage in this example, such as flash memory which can retain data without requiring applied power. Other examples may include volatile storage, which is kept powered by the power supply, or combinations of read-only and rewritable storage. Storage 210 is connected to the processor 200 and used to store both computer program instructions for execution by the processor and data, such as data from the pressure sensor 208 or received over the wireless communication interface 202. In some examples, storage 210 may store a history of pressure and/or temperature readings sensed by the pressure sensor 208 and the temperature sensor 209. For example, the previous ten days readings may be stored, with the newest data replacing the oldest once the storage is full.

Storage 211 is secure storage to which write and/or read access is restricted, for example only accessible to certain processes running on processor 200. Configuration data, such as wireless encryption keys can be stored in storage 211. In other examples, a single storage may be provided, or storage 210 and 211 may be provided in a single physical device with a logical partitioning between storage 210 and storage 211.

Figure 3:
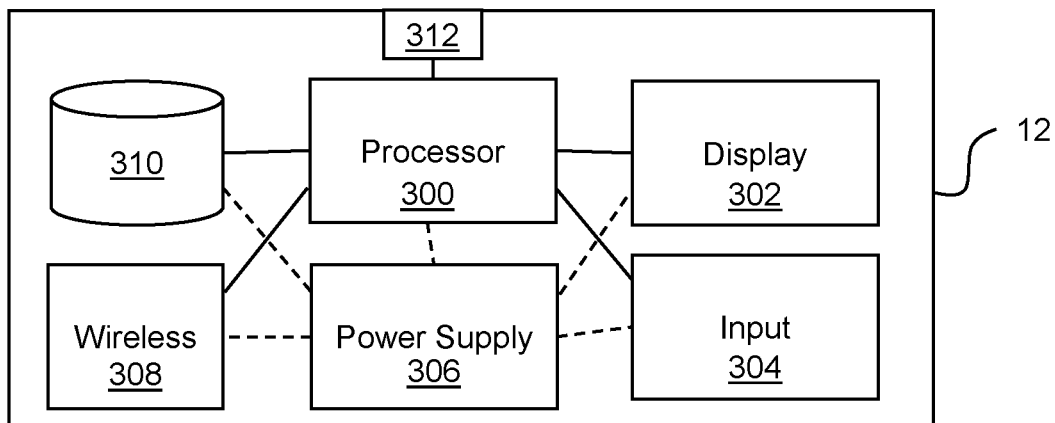
FIG. 3 shows a schematic representation of a control device for use in the example of FIG. 1.

FIG. 3 shows a schematic representation of a control device 12 for use in the example of FIG. 1. The control device 12 includes a processor 300, a display 302, an input system 304, a power supply 306, a wireless interface 308, a storage 310 and wired communication interface 312. In this example the control device is a mobile device, such as a cellular phone or a tablet computer.

The processor 300 is any suitable processing device, for example a multipurpose microprocessor, system-on-chip, or system in package, which may include one or more processing cores. Processor 300 is connected to the display 302, such an LCD, OLED or e-ink display to display information to a user of the control device.

Input system 304 includes a touch screen interface in this example, allowing a user to interact with the control device by touching user interface elements on the screen. The input system 304 may include one or more buttons in addition to the touch screen, as well as other input devices, such as a microphone for speech recognition and a camera for image input. Other examples may not include a touch screen interface.

The control device is powered by power supply 306, which is a rechargeable lithium-ion battery in this example. Other examples may use alternative power supplies, such as other battery technologies, mains power, or energy harvesting, such as solar power.

A wireless interface 308 is included for the control device 12 to communicate with other devices in the tyre pressure sensor system. In this example, a single wireless interface 308 is provided which is configured to communicate with the tyre monitoring devices 10. For example, a relatively long range wireless communication technology can be used, such as one conforming to IEEE 802.15.1, IEEE 802.15.4 or IEEE 802.11. This allows the control device 12 to interact with the tyre monitoring devices from a relatively long range.

In other examples, the control device may be provided with multiple wireless communication interfaces or transceivers, operating with different wireless technologies, such as at least two of IEEE 802.15.1, IEEE 802.15.4, IEEE 802.11 (Wi-Fi_33), WAIC, RFID and NFC. For example, the control device may have two transceivers with one having a longer communication range than the other.

Storage 310 includes a non-volatile element, such as flash memory, and a volatile element, such as RAM. The non-volatile element is used to store operating system software and application software. In this example, the control device runs standard operating system software and is loaded with application software to interact with the tyre pressure sensor system. In order to restrict access to the tyre pressure sensor network, the application software may be provided from a secure source and not available to the general public, and/or require credentials to be entered before operating.

Wired communication interface 312 is provided for connection to a computing system. The wired communication interface 312 can be for example, a serial data connection, such as Universal Serial Bus (USB), a parallel data connection or a network connection, such as Ethernet. The wired communication interface 312 may allow the control device to communicate values and/or other status information read from the tyre monitoring devices to the computing system, for example to store long term trends and assist fleet management. Alternatively, or additionally, wireless communication interface 308 may be used for communication with the computing system. In some examples, the control device may not include a wired communication interface.

Figure 4:
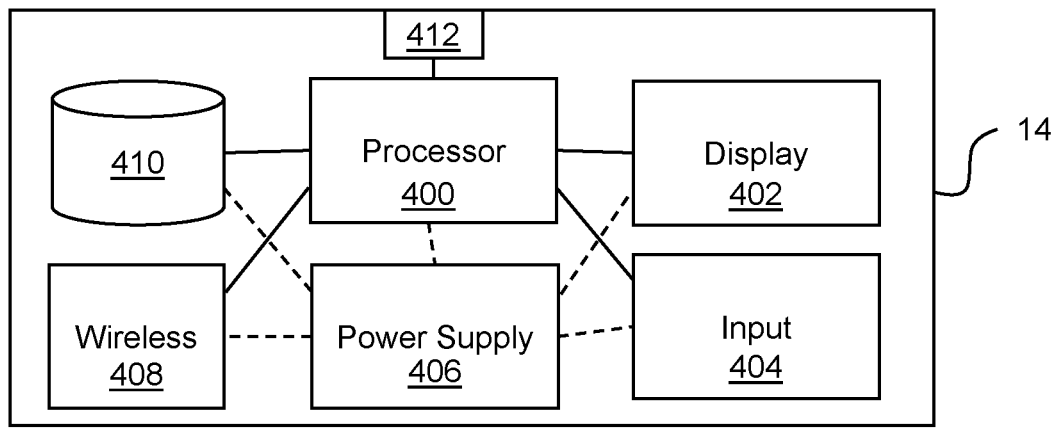
FIG. 4 shows a schematic representation of a configuration device for use in the example of FIG. 1.

FIG. 4 shows a schematic representation of a configuration device 14 for use in the example of FIG. 1. The configuration device 14 includes generally the same elements as the control device 12: a processor 400, display 402, input system 404, power supply 406, wireless interface 408, storage 410 and wired communication interface 412 and these are generally the same as described above for the control device, unless described otherwise below. In this example the configuration device is a mobile device but is restricted to operate only with the tyre monitoring system. For example, the configuration device may be a computing device or tablet which can only run software for interaction with the tyre monitoring system.

The wireless communication interface 408 of the configuration device in this example is a relatively short-range communication system, for example IEEE 802.15.1, IEEE 802.15.4, NFC or RFID. This allows the configuration device to act as an additional authentication factor when configuring the tyre monitoring devices, for example the tyre monitoring device may only respond to configuration commands received from the configuration device or may only respond to configuration commands received from the control device after a command received from the configuration device.

In other examples, the configuration device may include multiple wireless communication interfaces or transceivers. For example, the configuration device may include a transceiver for relatively short range communications as discussed above and a transceiver for relatively long-range communications, such as one conforming to IEEE 802.11.

The wired communication interface 412 of the configuration device may be used to provide information to the configuration device in a secure manner, for example enabling some encryption keys to be updated over a wired interface, such as a serial data connection, rather than a wireless interface.

In some examples, the configuration device 14 may be omitted and its place taken by the control device 12. The control device 12 may comprise a short range wireless communication interface, such as one conforming to IEEE, 802.15.1, IEEE 802.15.4, RFID or NFC. Application software may be loaded onto the control device to allow the control device to also function as an additional authentication factor, perhaps through the maintenance of cryptographic keys which can only be accessed with suitable credentials to control the operation of the short range wireless communication interface for the transmission of configuration commands. In these examples, separate application software may be provided on the control device which can be executed to cause the control device to function as a configuration device.

Figure 5:
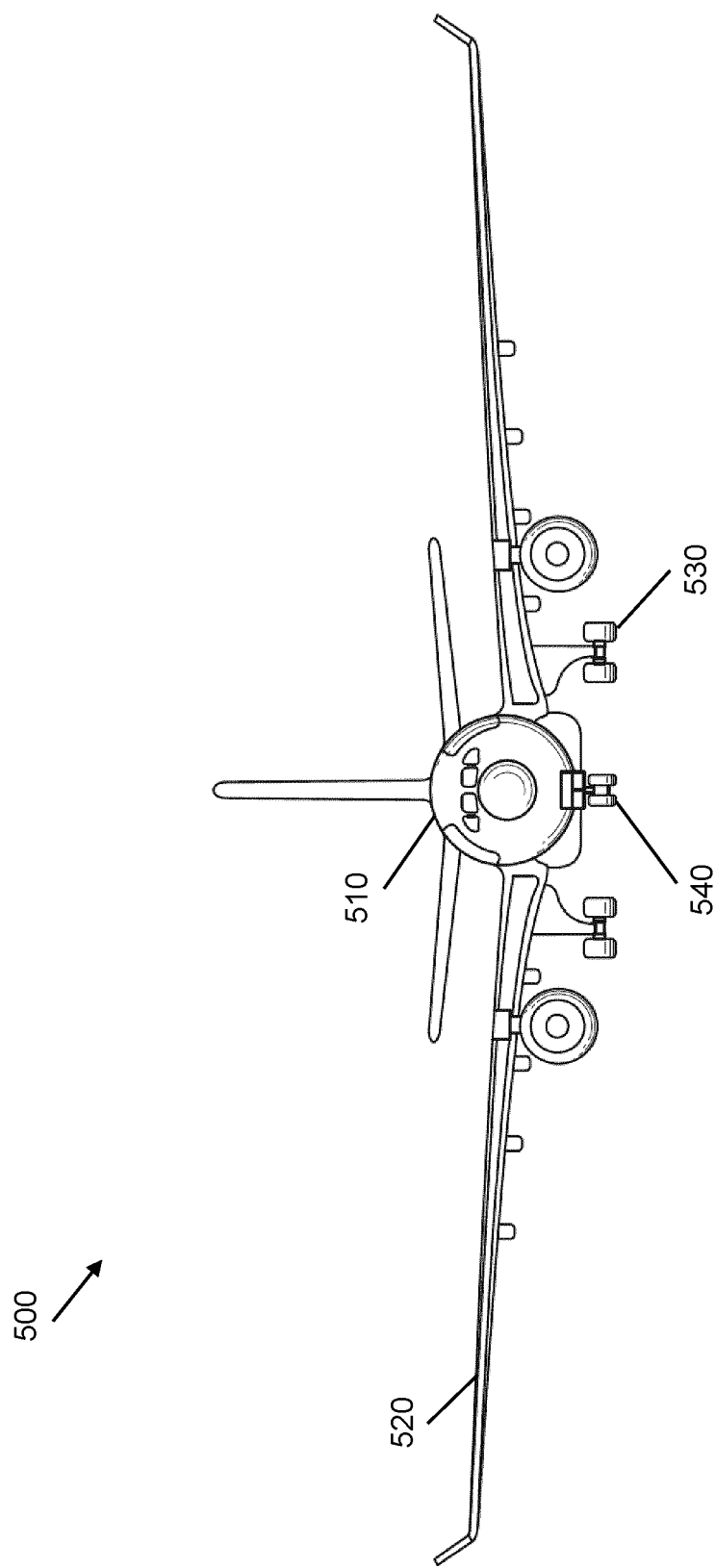
FIG. 5 shows a schematic representation of a tyre pressure sensor network installed in an aircraft.

FIG. 5 shows a schematic representation of a tyre pressure sensor network installed in an aircraft. The aircraft 500 comprises a fuselage 510, wings 520, main landing gear 530 and nose landing gear 540. According to an example, the aircraft 500 comprises a sensor network according to any of the examples described herein. The aircraft 500 may be used in conjunction with any of the methods described herein. According to an example, a plurality of wireless nodes are distributed at various locations around the aircraft 500. For example, in the landing gear 530, 540, the wings 520, and in the fuselage 510. Tyre monitoring devices are installed on each wheel of the main landing gear 530 and nose landing gear 540.

In an example, the tyre monitoring devices 10 are also in communication with a cockpit system to provide tyre pressure information to the pilots on the flight deck. In these examples, the flight deck console may also function as a control device.

Example Tyre Pressure Check Processes

Figure 6:
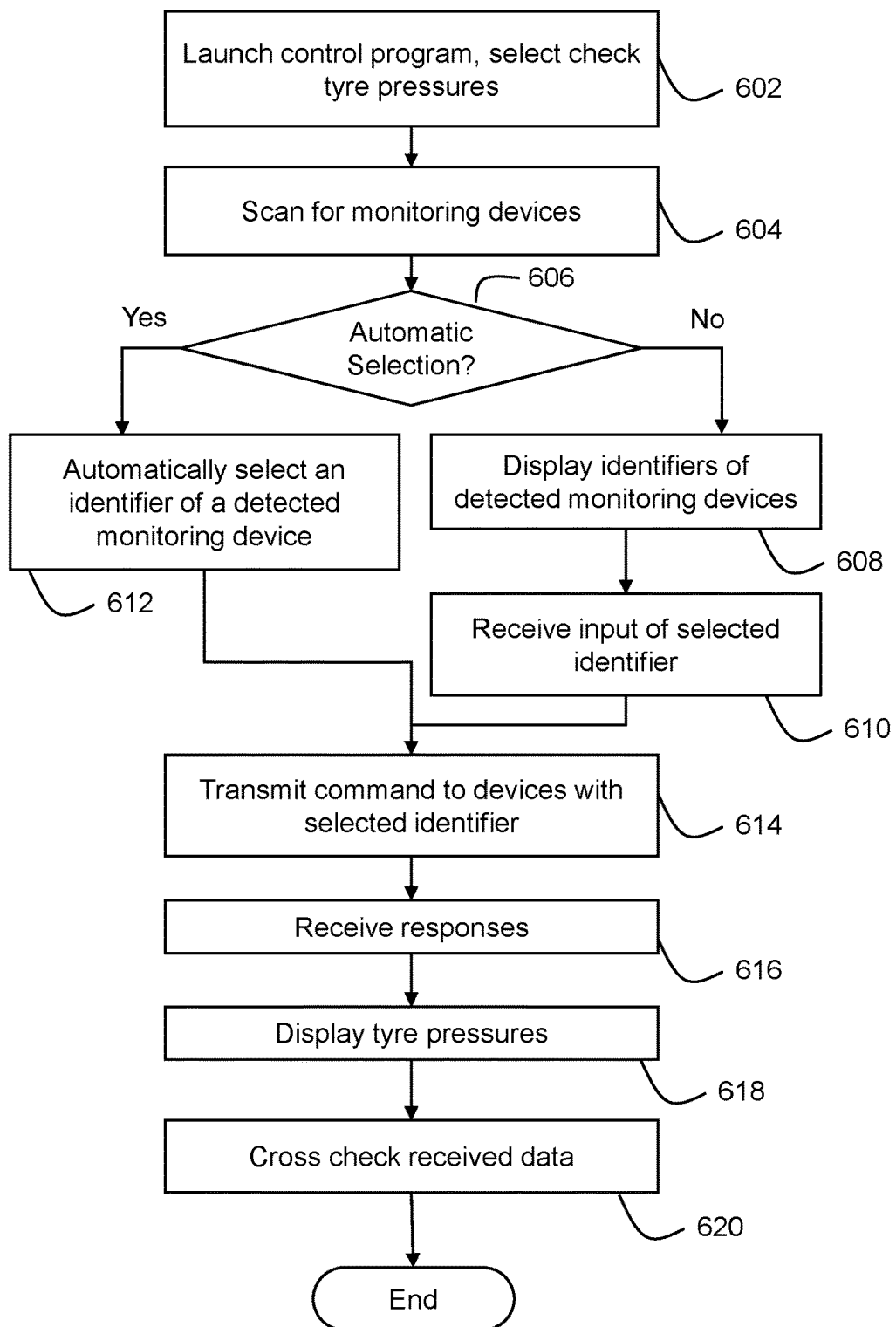
FIG. 6 shows a flow chart of a tyre pressure check process that can be used with the example of FIG. 1.

FIG. 6 shows a flow chart of a tyre pressure check process that can be used with the example of FIG. 1. First, at block 602, a user launches the tyre monitoring control application on the control device 12. During initialization of the application, a check is made that the wireless communication interface 308 for communication with the monitoring devices is active on the control device and the user is prompted to activate if it is not active.

Next, at block 604, the control device scans for tyre monitoring devices in range. For example, the control device may send out a probe over the wireless communication interface which causes any tyre monitoring devices in range to respond with an indication of their vehicle identifier, such as tail identifier of an aircraft to which the tyre monitoring device is attached. The scanning may comprise establishing direct, point-to-point contact with each tyre monitoring device, or contact through the network of tyre monitoring devices, for example through an access point, a master device, or any device in a mesh network. The scanning may comprise waking the tyre monitoring devices from a low power mode. The scanning may comprise using a secure network key to communicate with the sensor network.

Depending on the communication range and location, tyre monitoring devices associated with more than one vehicle may be detected. For example, several aircraft may be in the same hanger in range of the control device. Next, at block 606, it is determined whether an identifier should be selected automatically, without requiring using input. For example, the application may store a configuration option whether an identifier should be selected automatically or not. If automatic selection is not required, the process continues to block 608. If automatic selection is required, the process continues to block 612. In some examples, block 606 is not included. In these examples, the process can continue with either manual selection or automatic selection as explained below.

For manual selection, at block 608, the control device displays the identifiers of detected vehicles. At block 610, input is received of a selected identifier, for example from a user selection of the desired identifier.

For automatic selection, at block 612 a vehicle identifier is automatically selected from amongst the identifiers indicated in the received responses. The can be done in various ways. For example, when each tyre monitoring device in range responds individually to the control device, at least two responses may be from tyre monitoring devices associated with the same vehicle identifier. In that case, the vehicle identifier associated with the largest number of responses may selected automatically because that is likely to be the vehicle closest to the control device for which pressure measurement is required. In another example, the vehicle identifier of the tyre monitoring device closest to the control device may be selected, for example a response having a greatest Received Signal Strength Indication (RSSI). In a further example, all detected tyre monitoring devices may be associated with the same vehicle identifier, in which case that is selected.

Next, at block 614, a command is sent to the tyre monitoring devices corresponding to the selected identifier to cause them to read the pressures and report back to the control device, for example they may execute a process as described below with reference to FIG. 7.

Responses are received from the tyre monitoring devices at block 616 and displayed on the control device at block 618. The display of pressures may include one or both of a numerical value and a status indication such as "OK" or "Low Pressure".

At block 620 a cross check of the received data may be made to ensure data consistency. The process then ends.

Throughout the process of FIG. 6, communication between the control device and the sensor devices may be secure, for example encrypted by a network key. The network key for the communication with the control device may be different from the network key used for communication between the sensor devices to enhance the security of the system.

Security may be increased by using a wireless communication technology with a limited transmission distance when exchanging secure keys, for example 802.11 (Wi-Fi) standards may allow transmission over a distance of 50 m or further in clear space. This alone may be sufficient to provide increased security because physical proximity is required to intercept communications. In some examples, security may be increased by reducing transmission power when encryption keys are transmitted compared to transmission of the encrypted data itself, requiring closer proximity for the initial key exchange process.

Figure 7:
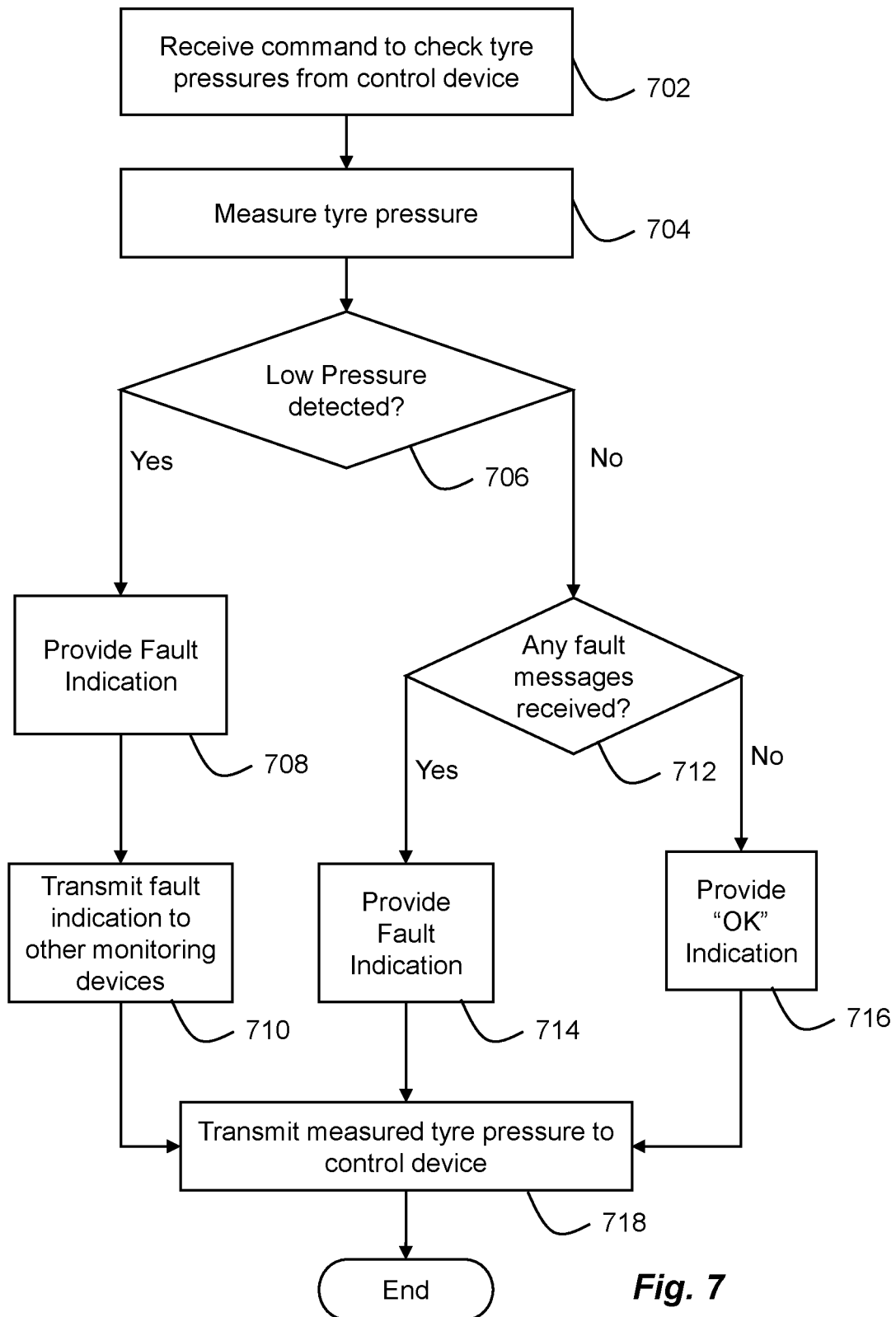
FIG. 7 shows a flow chart of tyre pressure check process that can be used by the tyre monitoring device of FIG. 2.

FIG. 7 shows a flow chart of tyre pressure check process that can be used by the tyre monitoring device of FIG. 2. This process is provided to provide additional assurance and fault tolerance in the pressure measurements from the system, for example to guard against corrupt operation or errors in the control device. Through this process, the monitoring device uses its indicator to provide an indication of tyre pressure status independent of the control device. In some examples, the indication of tyre pressure status by the monitoring device may have a higher Development Assurance Level (DAL) than the indication provided on the control device. For example, although the control device may be used to initiate a tyre pressure measurement and provide a convenient means for a user to understand the results of the measurement it may not have DAL certification, while the operation of the monitoring device to provide the indication using the indicator on the monitoring device may be certified to Development Assurance Level B. This may allow the system to operate with a wide range of control devices, because certification of those devices to a DAL is not required, but still ensure that the system as a whole meets required safety standards. Similarly, in some examples the monitoring device may have a higher Security Assurance Level (SAL) than the control device.

First, at block 702, a tyre monitoring device receives a command to check pressures over the wireless communication interface from the control device. In response, at block 704, the processor uses the pressure sensor to measure the pressure in the tyre. The measured pressure is then compared against the reference pressure in block 706 to determine whether the tyre has low pressure. In this example low pressure occurs if the pressure sensed by the pressure sensor is less than 89% of the reference pressure. Other examples may determine a low pressure when the measured pressure is less than 95%, less than 90% or less than 85% of the reference pressure. Further examples may determine a low pressure when the measured pressure is at least about 207 kPa (about 30 psi) less than the reference pressure. Other examples may determine a low pressure when the measured pressure is at least about 138 kPa (about 20 psi), or about 69 kPa (about 10 psi) less than the reference pressure. If low pressure is detected, execution proceeds to block 708, otherwise execution proceeds to block 712.

At block 708, the processor uses the indicator to indicate a fault condition, for example by providing a solid red light for a predetermined period. The predetermined period may be 5 minutes, 2 minutes, 1 minute, or 30 seconds, for example. The processor also broadcasts a fault indication to the other tyre monitoring devices at block 712, again using the wireless communication interface.

At block 712, the processor checks to see whether any fault messages from other tyre monitoring devices have been received via the wireless communication interface. Such fault messages may be received directly, via other tyre monitoring devices or through a hub or access point. In this example, such fault messages are received without first being requested, following the receipt of the command in block 704. In other examples, the fault message may be received responsive to a status enquiry sent by the tyre monitoring device to the other tyre monitoring devices. If any fault messages are received, execution proceeds to block 714, where the processor uses the indicator to display a fault condition. For example, the fault indication may be the same as that used in block 708. In other examples, the fault indication may be different than that used in block 708, for example a second fault indication such as a flashing red light for a predetermined period. By using the second fault indication, the tyre monitoring device can indicate a fault in another tyre yet signal that its own measured pressure is not low.

If no fault messages are received at block 712, execution proceeds to block 716 where the processor uses the indicator to provide an "OK" indication. For example, by providing a solid green light for a predetermined period. The predetermined period may be 5 minutes, 2 minutes, 1 minute, or 30 seconds, for example. In this way, the "OK" indication is only given when all tyre monitoring devices have determined that the pressure of their associated tyre is not low and that they have not received an indication of a fault from another of the tyre monitoring devices.

Finally, at block 718, the data of the measured tyre pressure is transmitted to the control device in response to the command. This data may include further information such as stored reference pressure, determined status, and wheel position. Transmission of additional information may allow verification of the correct operation of the tyre monitoring device and a check that the configuration data stored in the storage has not changed or has been set up correctly. The transmission in block 718 may be sent directly to a control device 12, to another tyre monitoring device 10 for onward routing, or to an access point or other wireless node.

With the method of FIG. 7, confirmation of tyre pressure status is provided by the tyre monitoring devices themselves. A fault in any sensor causes all sensors to indicate a fault. In this way, the tyre monitoring devices may be certified according to a required DAL and/or SAL using the indication on the tyre monitoring devices themselves without requiring the control device to also be certified.

In other examples, rather than transmitting a fault indication at block 710, all tyre monitoring devices may instead transmit their measured pressure to other tyre monitoring devices. Received pressures may then be independently checked by each independent tyre monitoring device to determine whether faults exist. This may guard against a fault in a sensor which does not indicate a low pressure condition, for example if the stored reference pressure has become corrupted.

In further examples, the tyre monitoring device may transmit an "OK" status notification when it is determined that the tyre pressure is not low in block 706. Such examples may provide assurance that all sensors are operating correctly, because if no data is received from one of the other tyre monitoring devices it is indicative of a malfunction or fault in that tyre monitoring device.

Although the processes above describe the use of a general mobile device as a control device, the control device may also be a dedicated device provided only for use with the tyre monitoring system, or with the vehicle more generally. This may improve security as greater control is available.

Although the processes above describe the use of an indicator which is a light, other examples may use other indicators, such as displays and/or audio components. For example, rather than simply display a solid or flashing colour, a display may also display information of the measured pressure itself. Where audio and visual indicators are both provided, some indications may not use both the audio and visual indicator. For example, an "OK" indication may use only the visual indicator, with the audio indicator only activated on a fault.

Determining when to Replace a Tyre Monitoring Device

Figure 8:
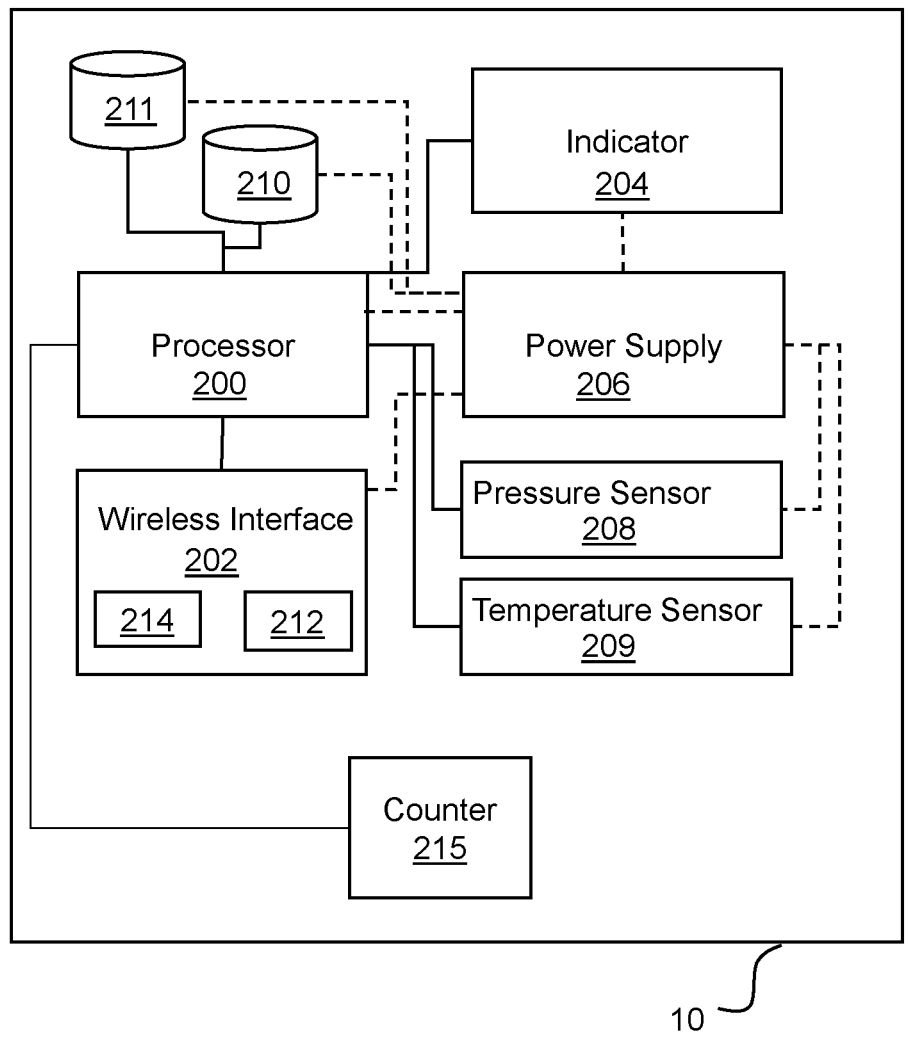
FIG. 8 shows a schematic representation of a tyre monitoring device for use in the example of FIG. 1.

FIG. 8 shows a schematic representation of a tyre monitoring device for use in the example of FIG. 1. The tyre monitoring device 10 of FIG. 8 is the same as that of FIG. 2 but with an additional component: a counter 215. The counter 215 may be a clock counter and is coupled to the processor 200. Counter 215 is configured to increment a count periodically following its activation. Accordingly, the count of the counter is a metric representative of an elapsed time period since activation of the counter 215. The counter can be activated on a first use of the tyre monitoring device, for example when it is first installed on a wheel. The counter 215 is not be reset once it has been activated.

In one example, the first use of the tyre monitoring device corresponds to a point in time at which the tyre monitoring device enters a normal operation mode for use in service to monitor a tyre. Entry into the normal operation may be, from a storage mode in which components other than the processor and wireless communication interface are powered off. Entry into the normal operation mode may occur on an initialisation of the tyre monitoring device, such as an initialisation prior to being used for the first time to monitor a tyre. Accordingly, the service life of the tyre monitoring device can be understood to be the period starting from the first use of the device and continuing through any subsequent periods of lower or intermittent power supply until the tyre monitoring device either stops working or is replaced.

During the service life of the tyre monitoring device the counter is incremented periodically from an initial value. In some examples, the counter is initialized at zero. Thus, the counter provides a measurement of the time the tyre monitoring device has been in service. Due to the periodic nature of incrementing the counter, the time in service can be determined directly from the counter value, for example the counter may be incremented once a second, so that a three year service life can be encoded using a 32-bit binary value. Other time periods may also be used depending on the accuracy required, for example incrementing the counter once a minute would allow a three year service life to be encoded using a 24-bit binary value. What is important is the counter is incremented periodically so that the difference between two values of the counter can be equated to a known time difference. However, as the tyre monitoring devices may all have been activated at different times, the values of their respective counters will all be different.

The tyre monitoring device has a predetermined service lifetime, for example the battery capacity may have an energy capacity sufficient to power the tyre monitoring device for at least three years and the service lifetime is three years. In other examples, for example those using energy harvesting such as vibration harvesting to charge a battery, the predetermined service lifetime may be based on an expected minimum lifetime of the components in the tyre monitoring device, such as three years. Although three years is given as an example here, the predetermined lifetime may be longer or shorter, such as one year, two years, four years or five years.

The processor 200 of the tyre monitoring device 10 determines a current value of the counter 215. In some examples, this is responsive to an instruction from another device received via the wireless communication interface 202, such as a control device 12. Subsequently, the processor 200 either: transmits a first response to the another device using the wireless communication interface 202, the first response including the current value of the counter 215 and causing the another device to determine a status of the tyre monitoring device 10 based on the current value; and/or determines a status of the tyre monitoring device 10 based on the current value of the counter 215 and transmits a second response to the another device using the wireless communication interface 202, the second response based on the status.

Each communication sent from the tyre monitoring device 10 to the control device 12 may include a current value of the counter 215. In this way, any readings, such as sensed temperature or pressure, sent to the control device 12 are accompanied with a counter value, allowing an event log containing temperature and/or pressure history to be established for the device in question as readings are taken over time. In some examples a history of events, for example pressure and/or temperature readings may be transmitted from the tyre monitoring device to the control device 12 in addition to a current reading In one example, any data received at the control device 12 from a tyre monitoring device 10, for example, the current value of a corresponding counter, may be sent from the control device 12 to another entity, such as a central management system, for processing. The central management system may then determine a status of the related tyre monitoring device. That is, a control device 12 may forward data received from tyre monitoring devices to a central management system for processing. Such a central management system can allow data for a fleet of vehicles, such as a fleet of aircraft to be monitored and analysed. For example the central management system may be associated with an aircraft operator, such as an airline, an aircraft maintainer serving several airlines, or an aircraft manufacturer.

Figure 9:
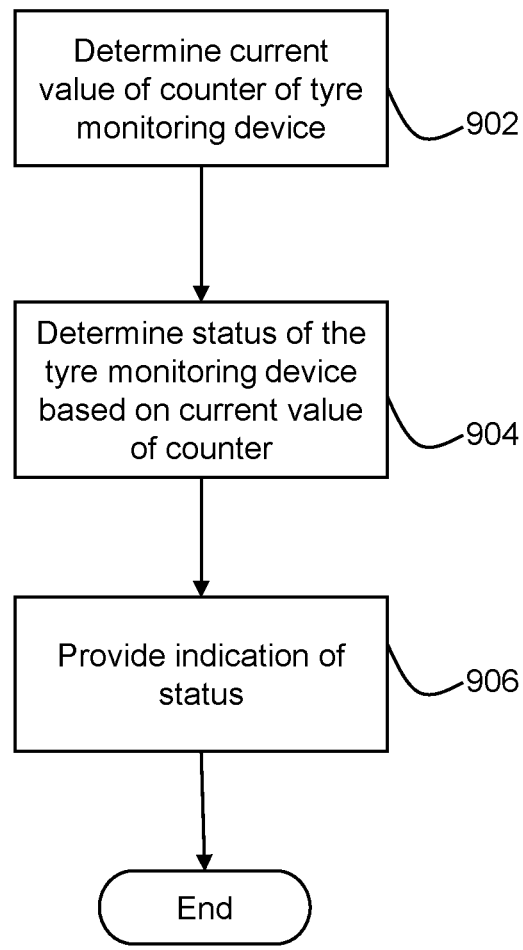
FIG. 9 is a flow chart of determining a remaining life of a tyre monitoring device.

FIG. 9 is a flow chart of determining a remaining life of a tyre monitoring device. The method of FIG. 9 may be carried out by a processor of the control device 12, a processor of the tyre monitoring device 10 or at another entity such as a central management system.

First, at block 902, a current value of a counter of a tyre monitoring device 10 is determined. This determination may be triggered by receipt of an instruction, such as an instruction from the control device 12, by completion of a reading by the tyre monitoring device, for example a pressure sensor reading or a temperature sensor reading, or at reaching a preset time for performing a check, for example, as part of series of checks or a regular periodic measurement process.

Next, at block 904, a status of the tyre monitoring device 10 is determined based on the current value of the counter, where, in one example, the status may be indicative of a duration of elapsed service life of the device.

The status of the tyre monitoring device 10 may be:
the unmodified value of the counter;
the duration (in ms, seconds, minutes and/or hours) of the elapsed service life of the monitoring device 10 from its first use calculated from the count value, for example by multiplying the count value by the duration between successive counts;
an estimate of remaining service lifetime of the monitoring device 10 which may be usefully expressed in terms of hours, days or months. For example, if the predetermined service lifetime is 3 years and the counter indicates an elapsed service life of two years, the remaining service life is 1 year, 12 months or 365 days;
a categorisation of the status of the monitoring device 10 in relation to an estimate of its total service lifetime, such a percentage lifetime remaining or lifetime used.
an indication the tyre monitoring device should be replaced based on the counter, for example when the value of the counter exceeds a predetermined threshold. For example if the counter increments once per second and replacement is recommended after 1,000 days the threshold could be 86,400,000. The threshold for the replacement recommendation could be set so that a predetermined time period, such as, at least 30, 60, 90 or 120 days, of operation remains after the replacement notification is triggered. In one example, the indication may be synchronised to calendar data stored on the control device. For instance, a new calendar entry that is representative of the indication may be created and stored on the control device so that an operator of the control device may be notified or presented with the calendar entry at a particular time or date either on or before the required replacement (time and/or date) of the tyre monitoring device. Such a calendar entry can also be provided to or synchronised with an external system, such as a central maintenance system.

At block 906, the method comprises providing an indication or notification based on the status. An indication generated by the tyre monitoring device may be transmitted to the control device 12. An indication generated by the control device 12 may be transmitted to another device, such as a central management system or server, or transmitted internally within the control device 12, for example, from the processor 300 to the display 302 to cause a graphical representation of the indication to be presented to a user of the device 12. The indication may provide a warning of the status, for example a warning that replacement should be scheduled or that the end of the service life is approaching.

Action may be initiated in response to the indication. For example, when the method is carried out on a central management server, an instruction may be transmitted to cause replacement of the tyre monitoring device at a particular time in the future. The instruction may further cause replacement parts to be provided to a location where the replacement is scheduled to take place.

When the status is the estimated remaining service lifetime for a tyre monitoring device 10 may be compared to a predetermined tyre replacement cycle for the tyre associated with the wheel on which the tyre monitoring device 10 is installed. Based on this comparison, a point in time on the tyre replacement cycle at which the service lifetime of the tyre monitoring device 10 ends may be identified. The result of such identification may form the basis of a notification, for example the notification may comprise transmitting an instruction that causes replacement to be scheduled.

In addition, such comparison may result in a determination that the estimated remaining service lifetime of the tyre monitoring device 10 expires between a scheduled time for a first tyre change and a scheduled time for a second tyre change of the predetermined tyre replacement cycle. In such a scenario, it is determined that the tyre monitoring device 10 is to be replaced at the time of the first tyre change. In other words, a tyre monitoring device 10 may be scheduled to be changed at a tyre change scheduled to occur before the expiry of the service lifetime of the device 10, and, in particular, at a tyre change that is scheduled closest to and preceding said expiry. This ensures that the tyre monitoring device 10 remains operational, within its service lifetime, when fitted to the corresponding wheel. To give a numerical example, if the normal tyre replacement period is 60 days and the estimated remaining service lifetime is between 61 days and 120 days, replacement of the tyre monitoring device may be scheduled with the next tyre replacement in 60 days' time. In some examples, further considerations may impact replacement scheduling, for example knowledge of the expected location of the vehicle for future tyre changes. This can be useful where not all service locations have the same facilities.

Although the discussion above has considered a counter which is incremented periodically, other examples may use a counter which is decremented periodically. When the counter is decremented it may provide a direct measure of the remaining service life by initialising it with a value equal to a service lifetime. Alternatively the counter could be initialised to the service lifetime and a predetermined additional amount, such as 6 months or a year, so that the counter does not need to use negative numbers if the tyre monitoring device is used beyond its designed service lifetime.

Cross-Checking Data Between a Plurality of Tyre Monitoring Devices

Figure 10:
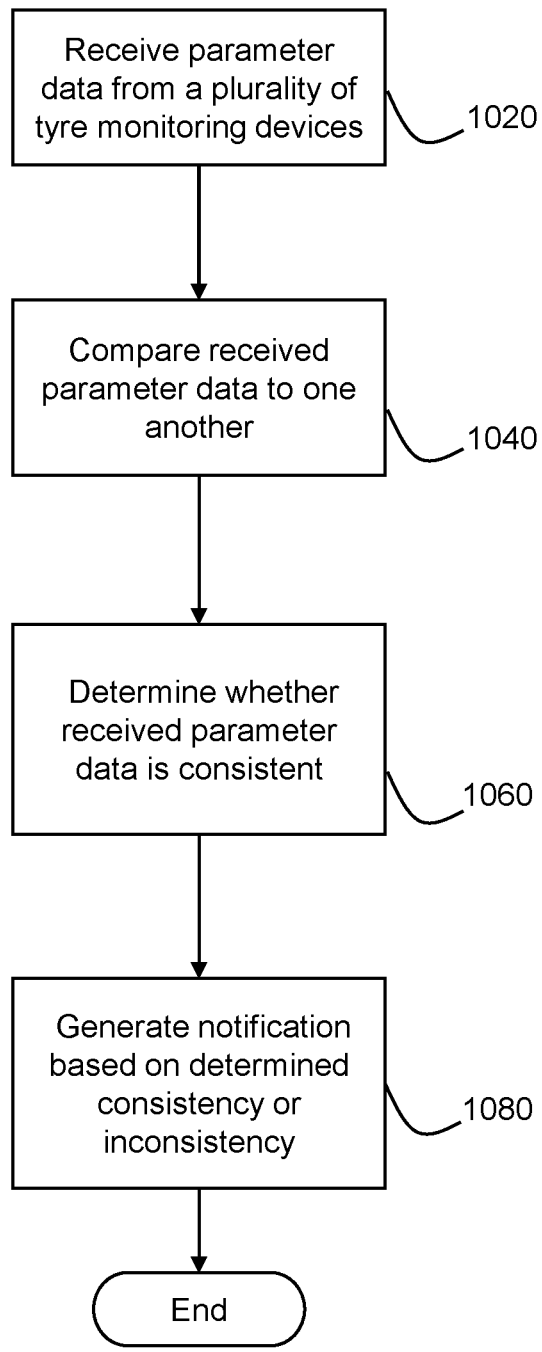
FIG. 10 is a flow chart of reviewing the operation of a tyre monitoring system.

FIG. 10 depicts a flow chart of cross-checking data of a tyre monitoring system comprising a plurality of tyre monitoring devices. By cross checking data, additional maintenance actions and/or potential faults can be identified that cannot be determined from the data of one tyre monitoring device in isolation. For example, the method can be used by the control device of FIG. 3 to cross-check data in the system of FIG. 1. The method may also be carried out by a central management system or server.

First, at block 1020, parameter data is received at a control device 12 from respective ones of a plurality of tyre monitoring devices 10. The parameter data is representative of information used by the respective tyre monitoring device in its operation. In some examples, the parameter data is representative of configuration information. For instance, the configuration information may be one or more of: a wheel reference pressure, a wheel identification, and a vehicle identification, such as an aircraft identifier. In some examples, the parameter data is additionally or alternatively representative of measurement information, for example measured pressure and/or temperature. Measurement information may be one or more of current measurements and historical measurements.

Next, at block 1040, received parameter data is compared to other received parameter data. In one example, the comparison occurs between parameter data received from tyre monitoring devices that are associated with the same vehicle identifier, and thus, the same vehicle. Accordingly, prior to block 1040, a determination may be made as to which tyre monitoring devices are associated with the same vehicle identifier. In another example, the comparison occurs between parameter data received from tyre monitoring devices associated with tyres on the same axle.

At block 1060, it is determined whether the parameter data is consistent with one another. When the received data is representative of a wheel reference pressure, the received data is determined to be inconsistent when the wheel reference pressures received from a plurality of tyre monitoring devices at the control device do not match. This means that any tyre monitoring device 10 with inconsistent data is relying on an incorrect wheel reference pressure. The inconsistency could be due to an error during configuration or memory corruption, but could not easily be detected from a single device in insolation.

When the received data is representative of a wheel identification, the received data is determined to be inconsistent when the wheel identifications received from a plurality of tyre monitoring devices associated with the same vehicle either comprise a duplicate wheel identification (where more than one device reports that it is associated with the same wheel) or are missing a wheel identification (where the tyre monitoring devices do not collectively identify as being related to each wheel of a vehicle). Again, this inconsistency could be due to an error during configuration or memory corruption.

When the received data is representative of a vehicle identification, the received data is determined to be inconsistent when the vehicle identifications received from a plurality of tyre monitoring devices do not match. That is, at least one tyre monitoring devices reports to be associated with a different vehicle than at least one of the other tyre monitoring devices.

When the received data is representation of a measured pressure of two tyres on the same axle, inconsistent data may be identified when the differential pressure is greater than 10% for example. In some cases, this pressure differential may exist between a correctly inflated tyre and either an underinflated tyre or an over inflated tyre. A differential pressure of more than 10% may cause additional wear to the correctly inflated tyre so that it should be replaced, despite its own pressure being acceptable. In some examples other differential thresholds may be used, for example 15%, 20% or a difference of 20 psi, 30 psi or 40 psi. These differential measurements can only be determined by cross checking data between devices.

In these ways, an objective cross-check of data is carried out between the tyre monitoring devices, which identifies inconsistent parameter data associated with one or more tyre monitoring devices. In some cases, the tyre monitor devices cannot themselves identify the erroneous data. Performing such a cross-check between data used by individual tyre monitoring devices allows incorrect data to be identified and corrected, ensuring correct operation of the tyre pressure sensor system.

At block 1080, an indication or notification is generated based on the determined consistency or inconsistency between the parameter data. The notification may be presented to a user on the display 302 of the control device 12. In another example, the notification may be sent to another device via the wireless interface 308 of the control device 12.

In some examples, in response to a determination that the parameter data is inconsistent the control device 12 may initiate an action to be taken either by itself or by the at least one tyre monitoring device that has the inconsistent data. As an example, reconfiguration of the tyre monitoring devices with correct configuration data may be initiated.

In one example, the cross check of FIG. 10 is implemented by a tyre monitoring control application running on the control device 12, where the control device 12 may communicate with a remote server providing the control application. In another example, the data processing described in relation to any of blocks 1040, 1060 and 1080 may be carried out by an entity other than the control device, for instance, the control device 12 may forward data received from the tyre monitoring device to a central management authority.

Further examples are provided with reference to the features below.

Feature 1: A method comprising:
receiving data from a plurality of tyre monitoring devices associated with respective tyres of a same vehicle;
comparing the received data from different ones of the plurality of tyre monitoring devices;
determining inconsistent data associated with at least one of the plurality of tyre monitoring devices based on the comparison; and
providing an indication of the inconsistent data.

Feature 2: The method of Feature 1, wherein the inconsistent data is configuration data.

Feature 3: The method of Feature 2, wherein the configuration data is representative of a tyre reference pressure and the determining inconsistent data comprises determining that the tyre reference pressure is different from a tyre reference pressure of another the plurality of tyre monitoring devices.

Feature 4: The method of Feature 2, wherein the configuration data is representative of a wheel identification, and the determining inconsistent data comprises determining either that a duplicate wheel identification is present or that a wheel identification is missing.

Feature 5: The method of Feature 2, wherein the configuration data is representative of vehicle identification, and the determining inconsistent data comprises determining that the vehicle identification is different from a vehicle identification of another of the plurality of tyre monitoring devices.

Feature 6: The method of Feature 1, wherein the inconsistent data is pressure data of two wheels mounted on a same axle.

Feature 7: The method of Feature 6, wherein the determining inconsistent data comprises determining that pressure data of two wheels mounted on a same axle differs by at least one of the following: 5%, 10%, 15%, 20%, or 25%.

Feature 8: The method of any of Features 1 to 7, further comprising causing an action in response to the determining inconsistent data.

Feature 9: An apparatus comprising:
a communication interface for receiving data from a plurality of tyre monitoring devices; and
a processing system configured to implement the method of any of Features 1 to 8.

Feature 10: The apparatus of Feature 9, wherein the apparatus is a control device and the communication interface is a wireless communication interface;

Feature 11: A method of reviewing the operation of a tyre pressure sensor system. The method comprises:
receiving, at a control device, parameter data from respective ones of a plurality of tyre monitoring devices, wherein the parameter data from each tyre monitoring device is representative of information used by the tyre monitoring device in its operation;
comparing the received parameter data to each other;
determining whether the parameter data is consistent with each other; and
generating a notification based on the determined consistency or inconsistency between the parameter data.

It is to be noted that the term "or" as used herein is to be interpreted to mean "and/or", unless expressly stated otherwise.

The above examples are to be understood as illustrative examples of the invention. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

The invention claimed is:

1. A method of determining a status of a tyre monitoring device comprising a counter initiated on a first use of the tyre monitoring device on a wheel, the method comprising:
determining a current value of the counter;
determining a status of the tyre monitoring device based on the current value of the counter; and
providing an indication based on the determined status.

2. The method of claim 1, wherein the status of the tyre monitoring device is representative of an elapsed time period since the tyre monitoring device was first used on a wheel.

3. The method of claim 1, wherein the status of the tyre monitoring device is an estimated remaining service lifetime of the tyre monitoring device.

4. The method of claim 3, comprising estimating the remaining service lifetime of the tyre monitoring device using the current value of the counter and a reference value indicative of a predetermined service lifetime of the tyre monitoring device.

5. The method of claim 4, comprising:
comparing the estimated remaining service lifetime of the tyre monitoring device to a predetermined tyre replacement cycle for the tyre associated with the wheel on which the tyre monitoring device is installed; and
the providing an indication is based on the comparing.

6. The method of claim 4, further comprising:
determining that the estimated remaining service lifetime of the tyre monitoring device expires between a scheduled time for a first tyre change and a scheduled time for a second tyre change of the predetermined tyre replacement cycle, wherein the indication indicates that the tyre monitoring device is to be replaced at the time of the first tyre change.

7. The method of claim 1, wherein the indication provides a warning about the status of the tyre monitoring device.

8. The method of claim 1, further comprising initiating action with respect to the tyre monitoring device responsive to the indication of status.

9. A tyre monitoring device configured to be mounted on a wheel and comprising:
a wireless communication interface;
a counter configured to be activated on a first use of the tyre monitoring device and to increment a count periodically throughout the service life of the tyre monitoring device; and
a processing system configured to execute the method of claim 1.

10. The tyre monitoring device according to claim 9, wherein the indication comprises a message transmitted to another device using the wireless communication interface.

11. A tyre monitoring system, comprising at least one tyre monitoring device and a processing system configured to execute a method of determining a status for the at least one tyre monitoring device comprising a counter initiated on a first use of the at least one tyre monitoring device on a wheel, the method comprising:
determining a current value of the counter;
determining a status of the tyre monitoring device based on the current value of the counter; and
providing an indication based on the determined status.

12. A counter for a tyre monitoring device, the counter configured to:

initiate a count in response to the tyre monitoring device entering normal operation; and increment the count as time passes, wherein an estimate of remaining life of the tyre monitoring device is determinable based on the count of the counter.

13. The tyre monitoring system of claim 11, wherein the status of the tyre monitoring device is representative of an elapsed time period since the tyre monitoring device was first used on a wheel.

14. The tyre monitoring system of claim 11, wherein the status of the tyre monitoring device is an estimated remaining service lifetime of the tyre monitoring device.

15. The tyre monitoring system of claim 14, comprising estimating the remaining service lifetime of the tyre monitoring device using the current value of the counter and a reference value indicative of a predetermined service lifetime of the tyre monitoring device.

16. The tyre monitoring system of claim 15, comprising:
comparing the estimated remaining service lifetime of the tyre monitoring device to a predetermined tyre replacement cycle for the tyre associated with the wheel on which the tyre monitoring device is installed; and the providing an indication is based on the comparing.

17. The tyre monitoring system of claim 15, further comprising:

determining that the estimated remaining service lifetime of the tyre monitoring device expires between a scheduled time for a first tyre change and a scheduled time for a second tyre change of the predetermined tyre replacement cycle, wherein the indication indicates that the tyre monitoring device is to be replaced at the time of the first tyre change.

18. The tyre monitoring system of claim 11, wherein the indication provides a warning about the status of the tyre monitoring device.

19. The tyre monitoring system of claim 11, further comprising initiating action with respect to the tyre monitoring device responsive to the indication of status.

* * * * *